(12) United States Patent
Dohle et al.

(10) Patent No.: US 6,242,122 B1
(45) Date of Patent: Jun. 5, 2001

(54) FUEL CELL ELECTRODE-ELECTROLYTE UNIT

(75) Inventors: Hendrik Dohle, Eschweiler; Volker Peinecke, Esslingen; Ilona Busenbender, Aachen; Thorsten Kels, Jülich, all of (DE)

(73) Assignee: Forschungszentrum Julich GmbH, Julich (DE)

( * ) Notice: Subject to any disclaimer, the term of this patent is extended or adjusted under 35 U.S.C. 154(b) by 0 days.

(21) Appl. No.: 09/297,886

(22) PCT Filed: Nov. 5, 1997

(86) PCT No.: PCT/DE97/02551

§ 371 Date: Aug. 3, 1999

§ 102(e) Date: Aug. 3, 1999

(87) PCT Pub. No.: WO98/21777

PCT Pub. Date: May 22, 1998

(30) Foreign Application Priority Data

Nov. 11, 1996 (DE) .............................................. 196 46 487

(51) Int. Cl.[7] .................................................. H01M 8/10
(52) U.S. Cl. ................................................. 429/30; 429/33
(58) Field of Search .......................................... 429/30, 33

(56) References Cited

U.S. PATENT DOCUMENTS

| | | | |
|---|---|---|---|
| 5,709,961 | * | 1/1998 | Cisar et al. .............................. 429/33 |
| 5,723,086 | * | 3/1998 | Ledjeff et al. .......................... 429/33 |
| 5,919,583 | * | 7/1999 | Grot et al. .............................. 429/33 |

FOREIGN PATENT DOCUMENTS

| | | | |
|---|---|---|---|
| 42 41 150 | * | 6/1994 | (DE) . |
| 96 29 752 | * | 9/1996 | (WO) . |

* cited by examiner

Primary Examiner—Nam Nguyen
Assistant Examiner—Gregg Cantelmo
(74) Attorney, Agent, or Firm—Kubovcik & Kubovcik

(57) ABSTRACT

An electrode-electrolyte unit for a fuel cell which prevents the permeation of the fuel used or the permeation of water through the electrolyte layer. An electrolyte is subdivided into two electrolyte layers with a barrier layer disposed between them. The barrier layer is permeable only to protons and may be coated with a catalytically active porous layer having a high effective surface area. A porous layer on the side of the unit facing the cathode increases the electrochemically active surface area and a porous layer on the side of the unit facing the anode ensures that a sufficient amount of hydrogen is dissolved. The fuel used can be hydrogen or methanol and suitable electrolytes include membranes or other solid or liquid electrolytes.

18 Claims, 2 Drawing Sheets

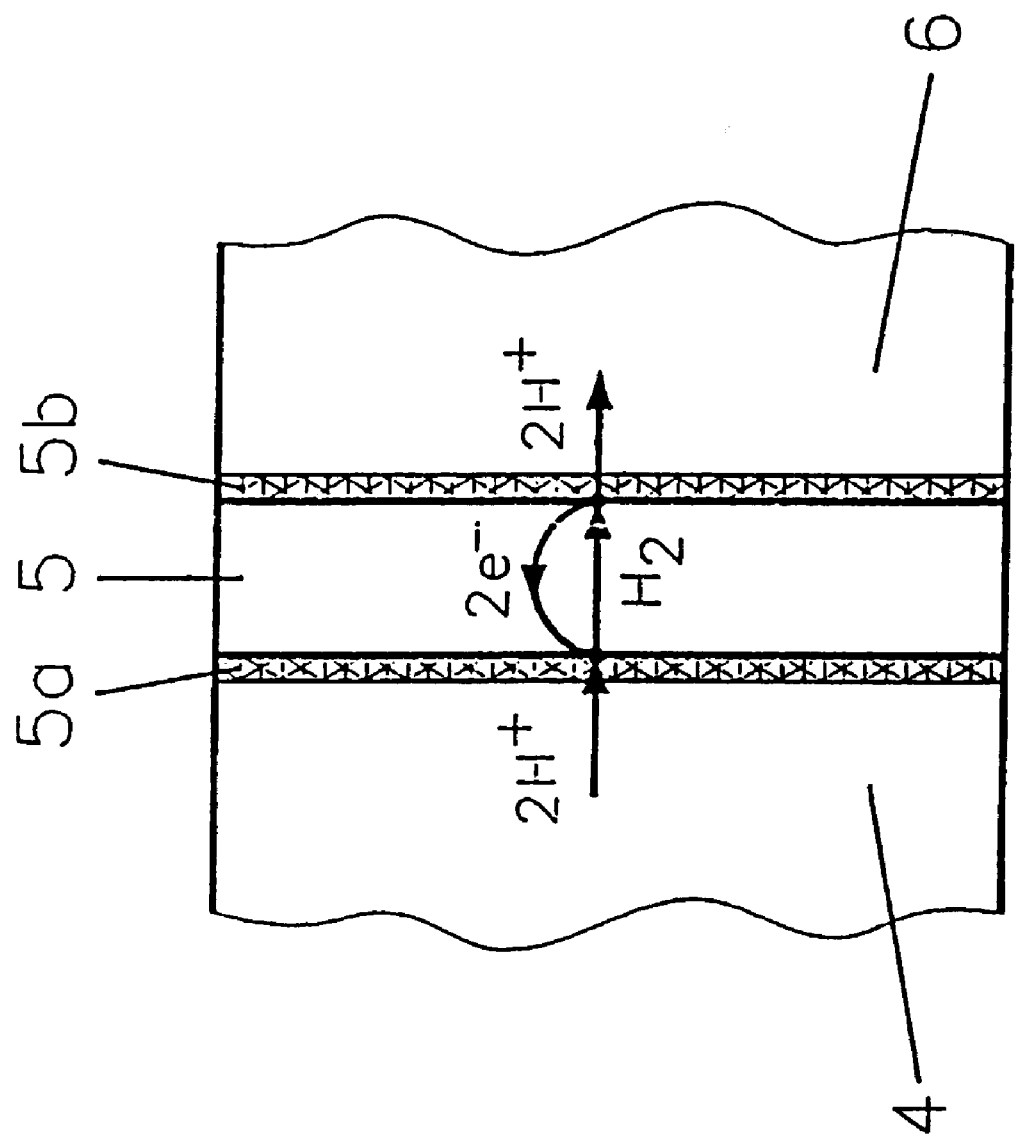

FUEL CELL ELECTRODE-ELECTROLYTE UNIT

BACKGROUND OF THE INVENTION

1. Field of the Invention

The invention relates to an electrode-electrolyte unit for a fuel cell, comprising a proton-conducting electrolyte which on one side is provided with a catalytically active anode and on the opposite side is provided with a catalytically active cathode and which operates using a fuel which is deprotonated at the anode. The fuel used can e.g. be hydrogen or methanol. Potentially suitable electrolytes include membranes or other solid electrolytes, e.g. made of ceramic material, or liquid electrolytes.

2. Description of Related Art

Fuel cells are systems which convert chemical energy into electrical energy. The central electrochemical functional element of a fuel cell is the electrode-electrolyte unit. Such an electrode-electrolyte unit comprising a ceramic solid electrolyte is disclosed e.g. by DE 40 33 286 A1. Further proton-conducting solid electrolytes in the form of oxides or fluorides are proposed in DE 39 29 730 C2=EP 0 417 464 A1.

Membrane fuel cells have an ion-conducting membrane which is disposed between two catalytically active electrodes, the anode and the cathode. The membrane used is a polymer material, for example. The anode material used is preferably platinum or a platinum-ruthenium alloy, the cathode material used preferably being platinum. The anode material and cathode material are either deposited on the membrane by a wet chemical process, or it is present as a powder and is hot-pressed with the membrane.

DE-C 42 41 150 describes methods according to which such membrane-electrode units can be fabricated.

In a fuel cell which, as stated at the outset, is operated directly using methanol, so-called direct-methanol fuel cells, or using another fuel which is deprotonated at the anode of the membrane-electrode unit, the protons permeate the electrolyte layer and react at the cathode side with the oxygen supplied there to form water. Fuel cells running on hydrogen work in a similar manner.

A drawback of the known fuel cells is that not only the ions are able to pass through the electrolyte, but to some extent also the hydrate shells of the hydrogen ions or part of the fuel. In the case of methanol-consuming fuel cells, the electrolyte is permeable to methanol molecules.

The drawback is, firstly, that the methanol poisons the cathode, leading to a reduced cell voltage, and secondly that the oxidizable fraction of the methanol at the anode is reduced, thereby reducing the fuel utilization factor of the fuel cell.

In hydrogen fuel cells the entrainment of water causes the anode to dry out, leading to reduced output. Consequently, additional humidification of the hydrogen is required.

Previous approaches to solving the problem of methanol diffusion in the case of direct-methanol fuel cells were directed, inter alia, at improving the anode kinetics, e.g. via appropriate anode activity, thereby causing all of the methanol to react at the anode, so that a low methanol concentration is established at the phase boundary anode/electrolyte. This is meant to ensure a reduction in the amount of methanol which penetrates and permeates the electrolyte layer. No anode structures, however, have been disclosed hitherto which would be adequately able to prevent the diffusion of methanol under all operating conditions.

SUMMARY OF THE INVENTION

The object of the invention is to specify an electrode-electrolyte unit of the type mentioned at the outset, in which the permeation of the fuel used or the permeation of water through the electrolyte layer is prevented.

This object is achieved by the electrolyte being subdivided into two electrolyte layers between which a single- or multilayer barrier layer is disposed which is made of a pore-free or closed-pore material which takes up protons on one side and gives up protons on the opposite side and is impermeable to all other substances.

Depending on requirements, the electrolyte layers can have identical or different thicknesses and be made of the same, e.g. polymeric, or of different materials.

In particular, the barrier layer is impermeable to methanol and water. Good utility as a barrier layer material is ensured by a palladium-silver alloy.

The silver fraction in the alloy is preferably at least 25 wt %. The hydrogen ions (protons) are capable of quasidiffusion through this barrier layer encountering little resistance, by recombining on one side into hydrogen, which then permeates the barrier layer and is redissociated at the opposite side, whereas other substances of large molecular size, in the present instance especially water and methanol, are held back. The liberated electrons migrate back to the side that takes up the protons.

The barrier layer used is preferably a foil having a thickness of 5–50 $\mu$m.

In an advantageous refinement of the invention, the barrier layer is coated on both sides with a catalytically active, porous layer having a high effective surface area.

In this arrangement, the porous layer on the side facing the anode has the purpose of ensuring that a sufficient amount of hydrogen is dissolved, whereas the porous layer on the side facing the cathode causes an increase in the electrochemically active surface area.

This porous layer or these porous layers can be applied in a manner known per se, for example by electrochemical deposition, or they are present in the form of a powder which is applied to the barrier layer. Potentially suitable materials for the porous layer in turn include a palladiumsilver alloy, platinum, a platinum-ruthenium alloy, or one or more elements of group VIII of the periodic table of the elements or alloys of these.

The barrier layer composite with the further elements of the electrode-electrolyte unit is then assembled in the previously known manner, as described e.g. for membrane-electrode units in a number of variants in the abovementioned publication.

A further advantageous refinement of the electrode-electrolyte unit according to the invention, particularly in the case of membrane fuel cells and, in this instance, especially for hydrogen-oxygen fuel cells, consists in the barrier layer being made so thick that it makes a substantial contribution to the mechanical stability of the electrode-electrolyte unit.

Beneficial values are 10–50 $\mu$m. As a result, the adjoining polymer layers can be kept very thin (5–20 $\mu$m), thereby furthering the proton conductivity of these. Without the barrier layer there is the problem, in particular with thin polymer membranes, of oxygen being able to diffuse from the cathode to the anode, thereby reducing the output of the fuel cell.

BRIEF DESCRIPTION OF THE DRAWINGS

The invention is explained below in more detail with reference to a specific embodiment of a membrane fuel cell. In the accompanying drawings, FIG. 2 shows a schematic for the processes at and in the barrier layer of the membrane electrode unit.

DETAILED DESCRIPTION OF THE INVENTION

Figure 1:
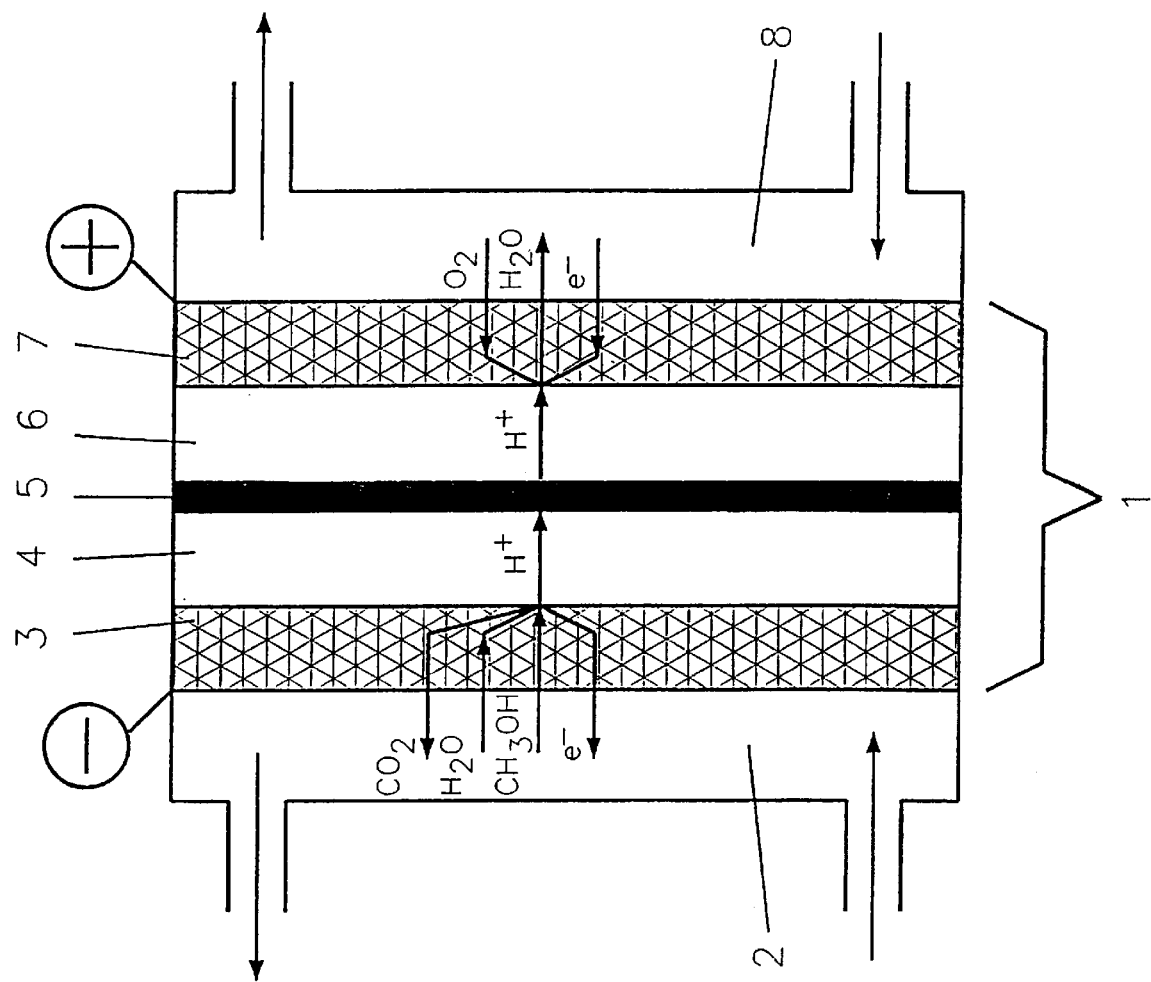
FIG. 1 shows the schematic design of a membrane fuel cell.

The electrode-electrolyte unit according to the invention, in this instance a membrane-electrode unit 1, as shown in FIG. 1, adjoins an anode compartment 2 which is supplied with a methanol-water mixture as the fuel. The methanol arrives at an anode 3, at which the anode reaction $$CH_3OH + H_2O \rightarrow CO_2 + 6H^+ + 6e^-$$

produces hydrogen ions (protons), electrons and carbon dioxide. The electrons are collected at the anode by a current distributor (not shown here) into an external (load) electric circuit and are fed to the cathode. The hydrogen ions permeate an adjoining electrolyte layer consisting of a polymer membrane 4, methanol and water being additionally entrained at the same time. An adjoining barrier layer 5 according to the invention, made of a palladium-silver alloy, holds back methanol and water, whereas the protons are capable of quasidiffusion (see the mechanism specified above and explained below once more in more detail).

The barrier layer 5 is followed by a conventional polymer membrane 6, through which the hydrogen ions arrive at a cathode 7, where they react with the oxygen which is supplied to the cathode 7 in the cathode compartment 8.

The membrane-electrode unit 1 is fabricated as follows:

By means of electrochemical deposition onto both sides of a thin palladium-silver foil (about 5 $\mu$m), a rough and microporous palladium-silver structure having a layer thickness of about 3 $\mu$m each is applied. These porous layers 5a, 5b are outlined in FIG. 2 on both sides of the barrier layer 5. The porous structure is desirable in order to provide a respective large surface area for both of the electrochemical reactions required and to create a region which conducts both electrons and ions.

The interlayer thus formed is then coated on both sides with an ionconducting polymer. To this end, a solution of the polymer in a water-alcohol mixture is slowly sprayed, using a spray pistol with uniform distribution, onto a porous layer, the spray gas used being nitrogen. The polymer layer, by filling the porous interstices at the surface of the porous layer, ensures that the ion-conducting polymer is intensively bound to the surface of the interlayer. After drying, the other side of the interlayer is treated in an identical manner.

The composite thus formed (having a thickness of about 10–15 $\mu$m) of barrier layer and polymer is then, after the second side has dried, bonded with two polymer membranes 4 and 6 by means of a hot-pressing process to produce the membrane according to the invention. To this end, the composite is inserted between two polymer membranes 4 and 6 (each having a thickness of about 50 $\mu$m) and is pressure-bonded to these by applying pressure and heat. Beneficial process parameters are a pressure of 200 bar, a temperature of 130° C. and a press time of 10 minutes.

This membrane provided with a barrier layer can now be used in a conventional membrane-electrode unit by being provided with a cathode in a similar manner.

The mechanism underlying the barrier layer can be understood as follows, as explained below with reference to FIG. 2:

At the side facing the anode 3, the hydrogen ions 2H$^+$ (protons) coming from the anode 3 recombine at the surface of the barrier layer 5, especially in the upper porous layer 5a, back into hydrogen H$_2$ (reduction), which diffuses through the palladium-silver foil. At the opposite surface (porous layer 5b) the hydrogen, as it escapes, is redissociated (oxidation) into hydrogen ions 2H$^+$, the free electrodes of the barrier layer composite, that were captured at the anode side, being given up again. The liberated electrons 2e$^-$ migrate through the metallic barrier layer 5 back to the anode side.

More simply, the interlayer introduced can be regarded as an electrochemical auxiliary system in which, between an auxiliary cathode (porous layer 5a—reduction of hydrogen ions) and an auxiliary anode (porous layer 5b—oxidation of hydrogen), both mass transfer and electron transfer proceeding in the opposite direction are taking place.

This principle ensures that only hydrogen ions can reach the fuel cell cathode.

What is claimed is:

1. Electrode-electrolyte unit for a fuel cell, comprising a proton-conducting electrolyte which on one side is provided with a catalytically active anode (3) and on the opposite side is provided with a catalytically active cathode (7) and which operates using a fuel which is deprotonated at the anode (3), characterized in that the electrolyte is subdivided into two electrolyte layers (4, 6) between which a single- or multi-layer barrier layer (5) is disposed which is made of a pore-free or closed-pore material which takes up protons on one side and gives up protons on the opposite side and is impermeable to all other substances.

2. Electrode-electrolyte unit according to claim 1, characterized in that the barrier layer (5) is made of a palladium-silver alloy.

3. Electrode-electrolyte unit according to claim 2, characterized in that the silver percentage in the alloy is at least 25 wt %.

4. Electrode-electrolyte unit according to claim 1, characterized in that the barrier layer (5) is a foil.

5. Electrode-electrolyte unit according to claim 4, characterized in that the foil has a thickness of 5–50 $\mu$m.

6. Electrode-electrolyte unit according to claim 1, characterized in that the barrier layer (5) is coated on both sides with a catalytically active, porous layer (5a, 5b).

7. Electrode-electrolyte unit according to claim 6, characterized in that the porous layer (5a, 5b) has been applied by electrochemical deposition.

8. Electrode-electrolyte unit according to claim 6, characterized in that the porous layer (5a, 5b) is present in the form of a powder applied to the barrier layer (5).

9. Electrode-electrolyte unit according to claim 6, characterized in that the porous layer (5a, 5b) has a thickness of 1–20 $\mu$m.

10. Electrode-electrolyte unit according to claim 6, characterized in that the porous layer (5a, 5b) is made of a palladium-silver alloy.

11. Electrode-electrolyte unit according to claim 6, characterized in that the porous layer (5a, 5b) is made of platinum.

12. Electrode-electrolyte unit according to claim 6, characterized in that the porous layer (5a, 5b) is made of a platinum-ruthenium alloy.

13. Electrode-electrolyte unit according to claim 6, characterized in that the porous layer (5a, 5b) comprises one or more elements of group VIII of the Periodic Table of the Elements.

14. Electrode-electrolyte unit according to claim 2, characterized in that the barrier layer (5) is a foil.

15. Electrode-electrolyte unit according to claim 3, characterized in that the barrier layer (5) is a foil.

16. Electrode-electrolyte unit according to claim 14, characterized in that the foil has a thickness of 5–50 μm.

17. Electrode-electrolyte unit according to claim 15, characterized in that the foil has a thickness of 5–50 μm.

18. Electrode-electrolyte unit according to claim 2, characterized in that the barrier layer (5) is coated on both sides with a catalytically active, porous layer (5a, 5b) having a high effective surface area.

* * * * *